INVENTOR
DONALD J. CAMPBELL

ATTORNEYS

*INVENTOR*
DONALD J. CAMPBELL

*ATTORNEYS*

INVENTOR
DONALD J. CAMPBELL

ATTORNEYS

*INVENTOR*
DONALD J. CAMPBELL

*ATTORNEYS*

INVENTOR
DONALD J. CAMPBELL

ATTORNEYS

United States Patent Office 3,443,463
Patented May 13, 1969

3,443,463

FREQUENCY DOUBLER AND COUPLER FOR ELECTRONIC MUSIC GENERATION SYSTEMS

Donald J. Campbell, Cincinnati, Ohio, assignor to Chicago Musical Instrument Co., Lincolnwood, Ill., a corporation of Delaware Filed July 26, 1965, Ser. No. 474,892
Int. Cl. G10h 1/00
U.S. Cl. 84—1.01 17 Claims

ABSTRACT OF THE DISCLOSURE

An electronic music generation system including a source of substantially square wave signals and a source of substantially sawtooth wave signals, each of said sources of signals having a frequency determined by an external frequency generator, a plurality of switches to select one or both of the signals, tone color filters to modify the selected signal, and an output amplifier.

The present invention relates to frequency doublers for signals of sawtooth waveform, and is particularly suited for use in electronic music generation systems for such purposes as an octave coupler and for the provision of higher octave sawtooth stops.

In the electronic generation of music, extensive use is made of waveforms having high harmonic content to obtain desired tone color or timbre. Square and sawtooth waves, or approximations thereof, are the forms most commonly employed for this purpose, and therefore it is necessary to provide such waveforms at appropriate octave frequencies. In accordance with the present invention, it has been found that by appropriately combining sawtooth and square wave signals of equal frequency, a sawtooth wave of double said frequency can be obtained. This concept can be used simply as a means for providing a higher octave sawtooth signal in place of other more complex standard generators of the higher octave. In addition, since the foregoing concept depends on the presence of the lower octave sawtooth and square waves, the degree of combination can be controlled and varied so as to produce a sawtooth output having both octaves present, to provide an octave coupler. Also, by selecting the relative relationships of the input sawtooth and square waves, one can produce outputs varying from the relatively pure lower octave or input sawtooth signal, to a mixed lower and upper octave sawtooth signal, to a relatively pure upper octave sawtooth signal, to a mixed lower octave square wave and upper octave sawtooth signal, to a relatively pure lower octave square wave signal. Thus, by these combinations and transitions the invention can be utilized to produce various electronic sound effects, such as octave alternation reiteration, a type of tone color vibrato, and many varieties of speaking tone effects involving octave pitch changes and tone color changes.

It is accordingly one object of the present invention to provide a sawtooth frequency doubler.

Another object of the present invention is to provide a sawtooth frequency doubler utilizing existing signals available in an electronic music generation system.

Another object of the present invention is to provide a sawtooth wave of frequency $2f$ by the combination of sawtooth and square waves each of frequency $f$.

Still another object of the present invention is to provide, by the combination of a square wave and a sawtooth wave, each of frequency $f$, a sawtooth wave of frequency $2f$, or combinations of the latter with either of the former.

Other objects and advantages of the present invention will become apparent to those skilled in the art from a consideration of the following illustrative examples of the invention, had in conjunction with the accompanying drawings, in which like numerals refer to like or corresponding parts, and wherein.

Figure 1:
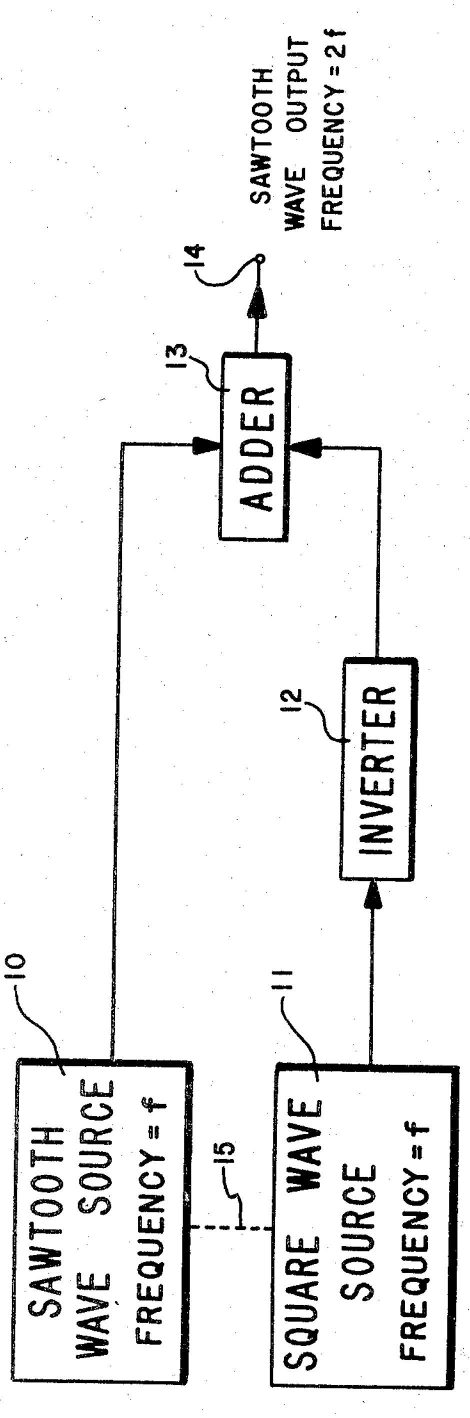
FIG. 1 is a functional block diagram illustrating the the basic feature of the present invention.
Figure 2:
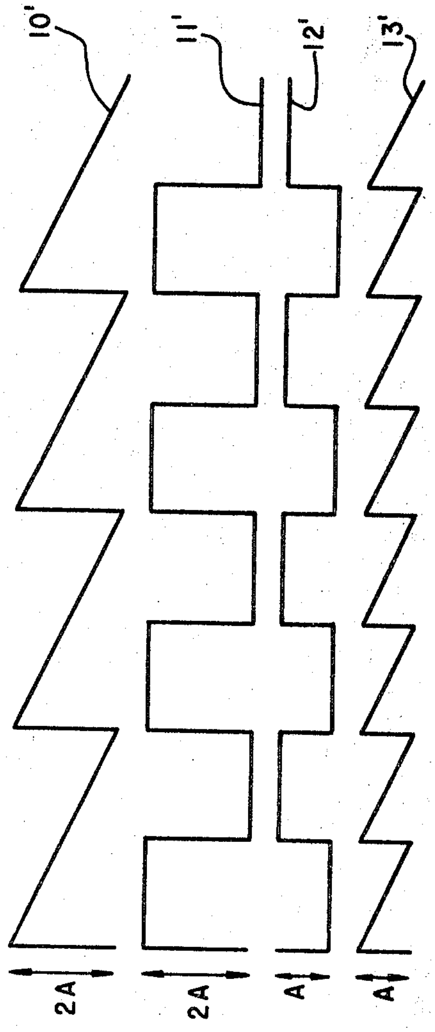
FIG. 2 is a waveform diagram showing the signal relationships obtained by the system of FIG. 1.

The basic concept utilized in the present invention is illustrated in FIGS. 1 and 2. Two generators or signal sources are shown in FIG 1: one is a sawtooth wave signal source 10 providing an output of frequency $f$ at an amplitude 2A, represented as waveform 10′ in FIG. 2; and the other generator 11 is a square wave signal source, producing a signal also of frequency $f$ and amplitude 2A, illustrated as waveform 11′ in FIG. 2. The two generators 10 and 11 are driven in synchronism as indicated by the coupling 15, and their outputs are in phase and of equal peak amplitude, as shown in FIG. 2. The square wave output of generator or source 11 is inverted at 12 and the outputs of inverter 12 and source 10 are combined in a network indicated as adder 13. The network of adder 13 is selected to provide an amplitude for the square wave signal of one half that of the sawtooth signal, as indicated by waveform 12′ in FIG. 2. The addition of sawtooth waveform 10′ of frequency $f$ and amplitude 2A with the waveform 12 of frequency $f$, amplitude A, and phase displaced 180° from that of waveform 10′, produces an output at 14 of the sawtooth waveform 13′, having an amplitude A and frequency $2f$.

Figure 3:
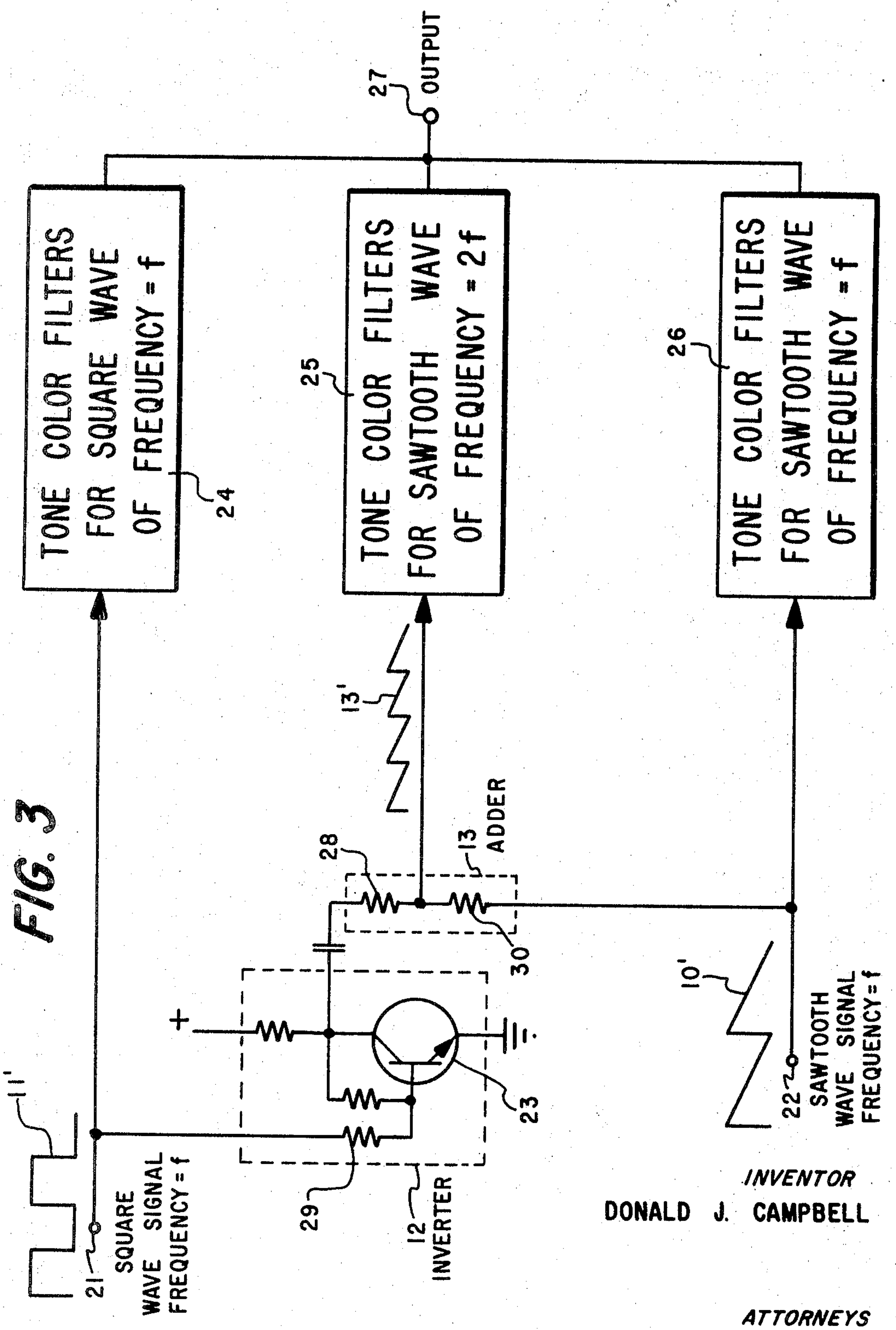
FIG. 3 is a combined block and schematic diagram illustrating an embodiment of the invention.

A circuit utilizing the above-described frequency doubler as a higher octave stop in an electronic music system is illustrated in FIG. 3. The synchronized square wave and sawtooth wave tone signals 11′ and 10′ of a given frequency $f$ and of equal amplitude are applied at inputs 21 and 22 respectively. The square wave 11′ is coupled to drive its tone color filters 24, and the sawtooth wave 10′ is coupled to drive its tone color filters 26, each capable of producing an output at 27, all as well understood in the art of electronic tone generation. The presence of a signal from one or both of filters 24 and 26 depends of course on the call for the note of frequency $f$ and a particular tone color.

In addition, the square wave 11′ is inverted by transistor 23 in inverter 12. Resistor 29 is selected to provide unity gain in the inverter circuit, so that both signals from 21 and 22 when applied to the adder 13 are of substantially equal amplitude. In the adder, the relative value of resistors 28 and 30 are selected to obtain peak amplitude for the square wave 11′ of one half that of the sawtooth wave 10′. The resultant output of adder 13 is sawtooth wave 13′ having a frequency of $2f$, thus embodying a one octave increase in frequency over the input signals at 21 and 22. This signal 13′ is coupled to drive the tone color filter 25, and may be selectively called at the output 27 as required.

Figure 4:
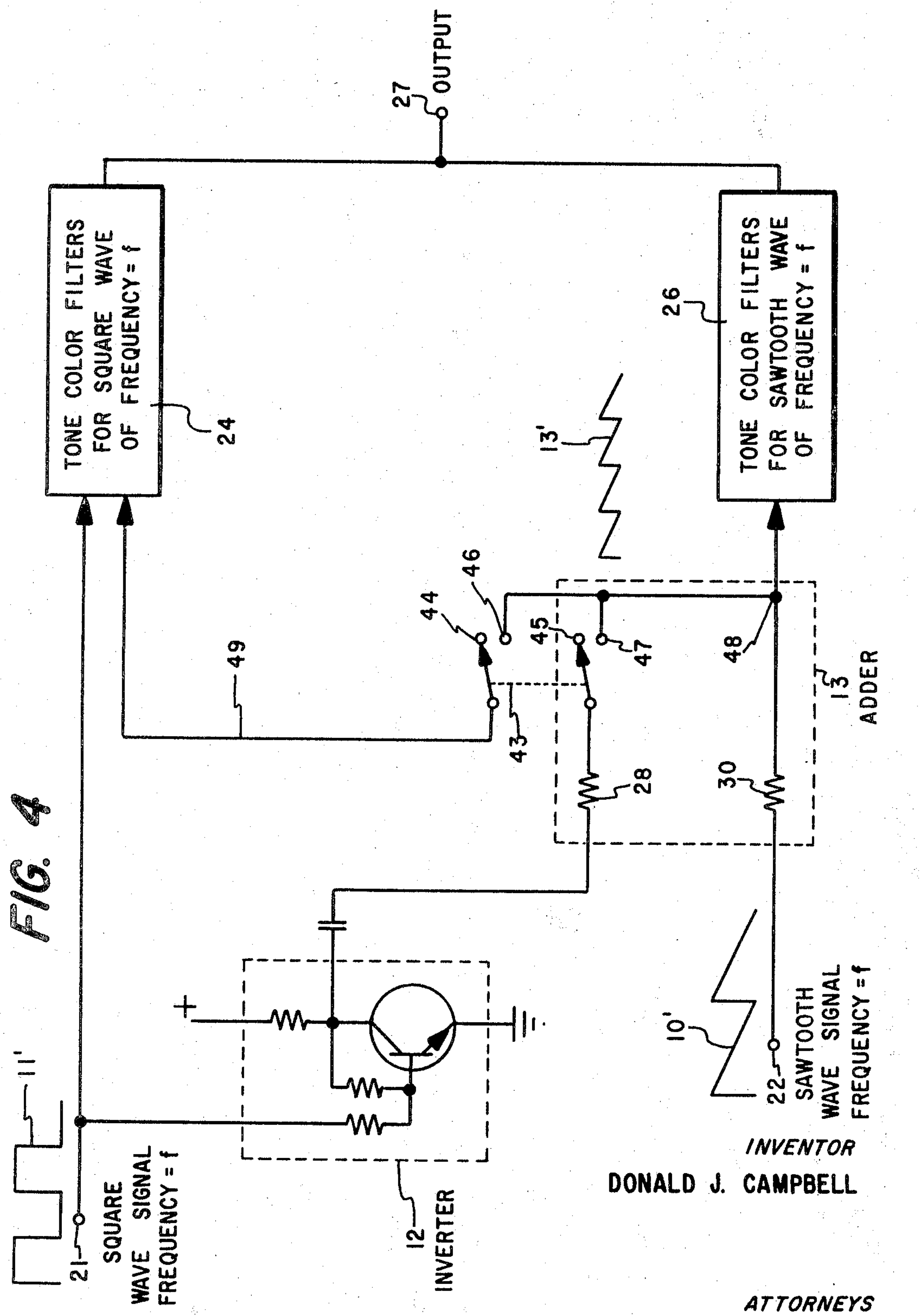
FIG. 4 is a combined block and schematic diagram illustrating another embodiment of the invention.

FIG. 4 illustrates the application of the present invention as a higher octave coupler for lower octave tone generating signals in an electronic music device. As in the preceding embodiment of the invention, in FIG. 4 synchronized square wave and sawtooth wave signals both of frequency $f$ are applied to the input terminals 21 and 22 respectively. These signals are directly coupled to their respective tone color filters 24 and 26. In addition, as in the preceding embodiment, the square wave signal 11' is coupled to the inverter 12, and the inverted signal is coupled to the adder 13. Adder 13 and switch 43 combine to effect a different operation of the present circuit from that of FIG. 3. When the switch is opened so as to be in the position 44, 45 shown, there is no coupler action since the output of the inverter is in an open circuit. The drop occasioned by resistor 30 in the line coupling the sawtooth input 10' to the sawtooth tone color filters 26, can be readily compensated either in the tone color filter circuit or the level of the input signal at 22, or it may be balanced by a corresponding resistor in the line coupling input 21 to tone color filters 24.

When switch 43 is closed to the position 46, 47, coupler action is effected. The values of resistors 28 and 30 in the adder 13 are selected so that the mixing ratio provides a signal at point 48 of both waveforms 13' (frequency $2f$) and 10' (frequency $f$). The tone color filters 26 are thus driven by a sawtooth signal having combined components of a higher and lower octave. Since a $2f$ frequency square wave signal is not produced by the present system, ideal square wave coupler action is not available. However, a useable coupler action can be effected by using the $2f$ sawtooth wave 13' on line 49 to drive the square wave color filters 24 in combination with the square wave 11'.

Figure 5:
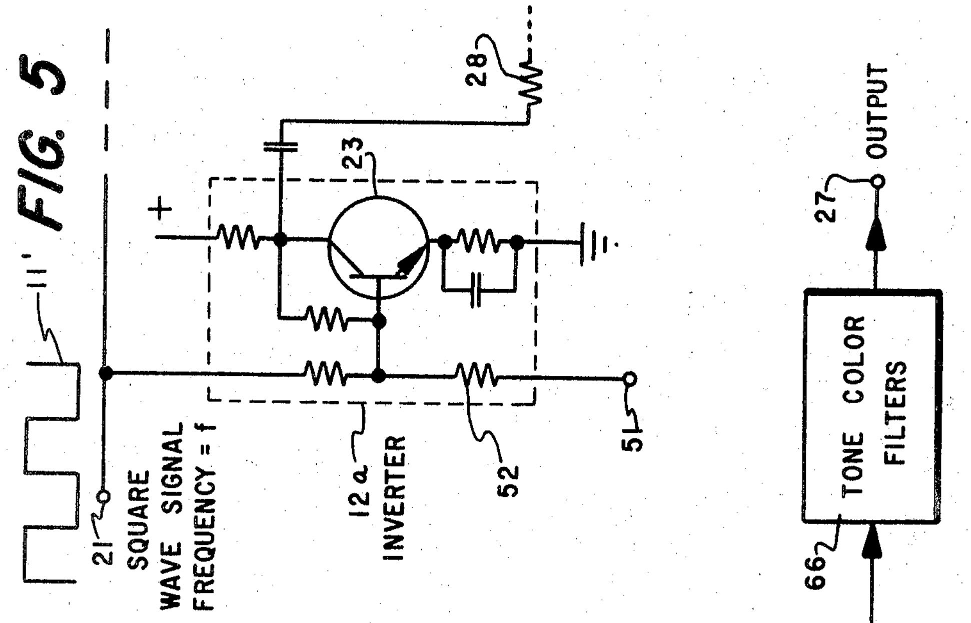
FIG. 5 is a schematic diagram showing a modification of a portion of the embodiment shown in FIG. 4.

A further modification of the present invention is indicated in FIG. 5, which shows a portion of the system, namely the inverter circuit 12a, which is intended to be substituted for the inverter circuit 12 in FIG. 4. The primary difference between these inverter circuits is the presence of input 51 coupled through resistor 52 to the base of transistor 23 in FIG. 5. By applying an appropriate signal to input 51 one can control the gain of transistor 23. In this manner it is possible to obtain any amplitude ratio of the $2f$ sawtooth waveform 13' to the sawtooth wave 10' and to the square wave 11', and thereby obtain any degree of coupler action desired. The degree of coupler action can be rapidly varied with the dictates of complex signals that may be applier at input 51.

Figure 6:
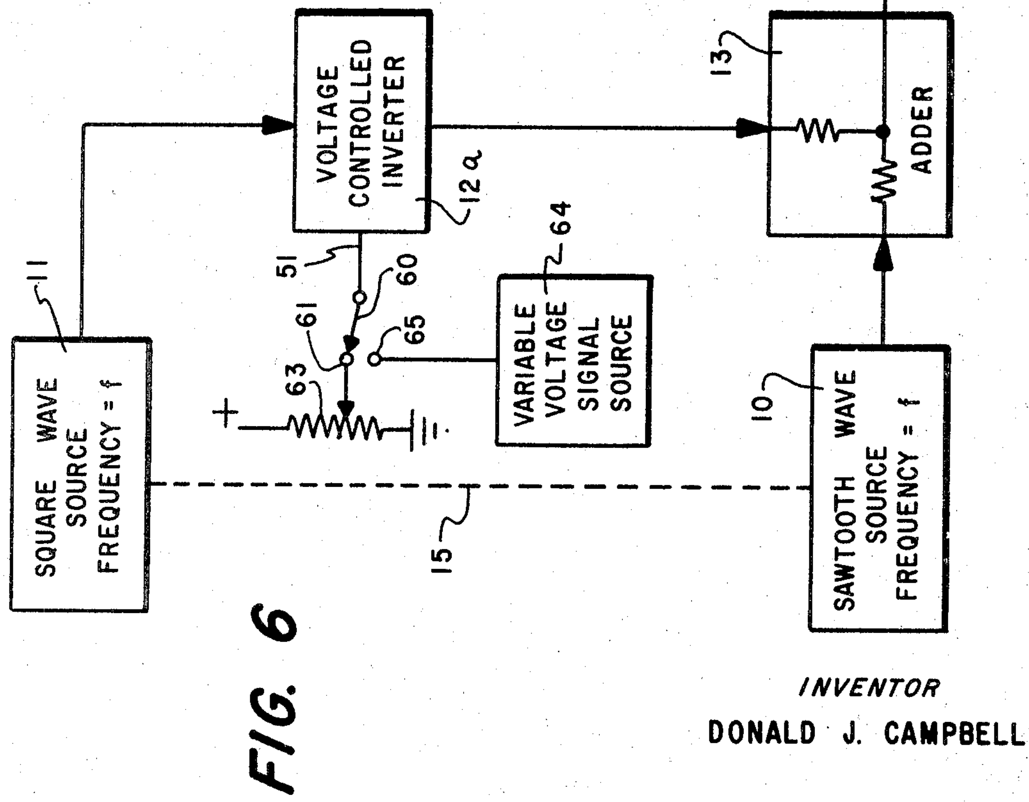
FIG. 6 is a functional block diagram illustrating another embodiment of the invention.

A further modification of the coupler embodiment of the invention is schematically illustrated in FIG. 6. Since it utilizes the principles already described in detail, its operation will be readily understood from the following brief description. The square wave and sawtooth wave signals of frequency $f$ of equal peak amplitude are obtained from sources 11 and 10 respectively, and are maintained in synchronism as indicated by the designation 15. The square wave signal is inverted at 12a and added to the sawtooth signal at 13, and the resultant signal drives the tone color filters 66 to provide a desired output at 27. With the switch 60 in the position 61, the position of the tap on potentiometer 63 controls the gain of inverter 12*a*; and with the switch 60 in the position 65, a variable voltage source 64 controls the gain of inverter 12a. By varying the gain of inverter 12a, the output of the adder 13 to the tone color filters can be caused to vary from the sawtooth waveform of source 10 alone (inverter 12a cut off), to a mixture of the sawtooth source 10 with sawtooth waveform 13' of frequency $2f$ (the gain of inverter 12a set to less than unity), to the sawtooth waveform 13' of frequency $2f$ alone (the gain of inverter 12a set to unity), to a mixture of sawtooth wave 13' of frequency $2f$ and the square wave of frequency $f$ (the gain of inverter 12a set to greater than unity), to an approach to nearly pure square wave of frequency $f$ (the gain of inverter 12a set to much greater than unity). As will be apparent to those skilled in the art, these electrical effects can be utilized to provide ocative alteration and reiteration, a type of tone color vibrato, and many varieties of speaking tone effects involving octave pitch changes and tone color changes. The tone color changes referred to, of course result from the signal output of the adder 13 changing between a sawtooth and a square wave output.

Figure 7:
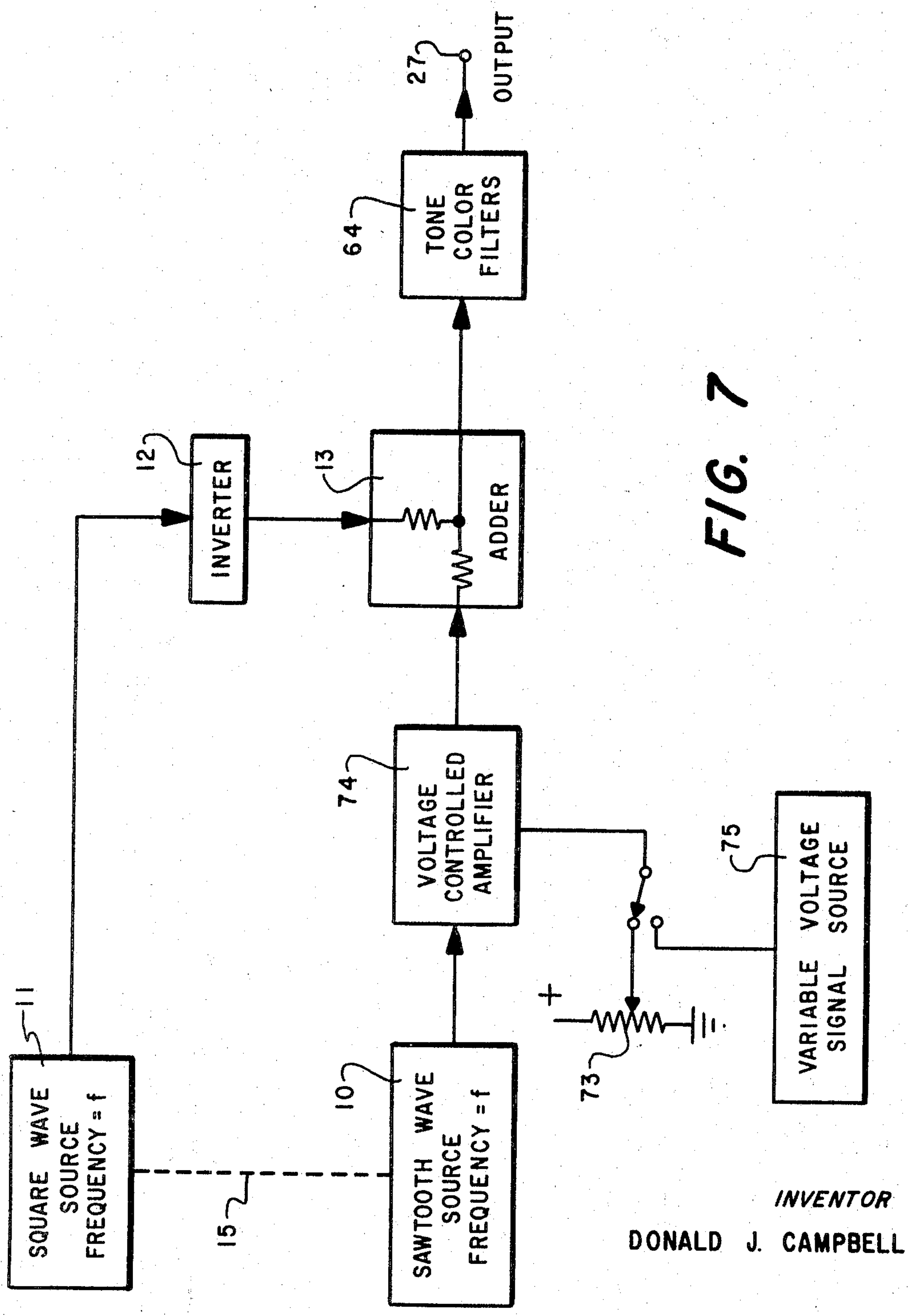
FIG. 7 is a funtcional block diagram illustrating still another embodiment of the invention.

Nearly the very same effects can of course be obtained by coupling the variable control to the sawtooth input rather than to the square signal input, as shown in FIG. 7. Since operation of this system will be readily understood from the description of FIG. 6, it need be only briefly mentioned that the variable control is effected through an amplifier 74 in the sawtooth input path from source 10. Thus, as the gain of the amplifier 74 is varied by either the potentiometer 73 or the variable voltage signal source 75 from cut off, through unity, to greater than unity, the output of adder 13 to the tone color filters 64 varies from pure square wave of frequency $f$, to a mixture of square wave of frequency $f$ and sawtooth wave of frequency $2f$, to sawtooth wave of frequency $2f$, to a mixture of sawtooth waves of frequencies $f$ and $2f$, to nearly a pure sawtooth wave of frequency $f$. The purpose and function of this form of the coupler embodiment is of course substantially the same as described for the embodiment of FIG. 6.

It will thus be appreciated from the foregoing descriptions of several embodiments of the invention that there is provided a sawtooth wave frequency doubler, utilizing signals normally available in electronic music generation systems, and hence particularly adapted for that environment. And further, it will be appreciated that by the use of these embodiments and their principles one is enabled to produce many sound effects desired in rendering musical tones in various tone colors electronically. It will be understood, of course, that these embodiments are presented only as exemplary of the invention, and many changes and modifications will become apparent to those skilled in the art. Accordingly, such modifications and changes as are embraced by the spirit and scope of the appended claims are contemplated as being within the purview of this invention.

What is claimed is:

1. In an electronic music generation system, a source of substantially square wave signals having a given frequency, a source of a first substantially sawtooth wave signal having said frequency, means for combining said two signals in such substantially 180° out of phase relationship as to derive a second substantially sawtooth wave signal from said two signals, and tone color filter means connected to receive said signals.

2. In a system as set forth in claim 1, said tone color filter means comprising first filter means driven by said square wave signal, and second color filter means driven by both said sawtooth wave signals.

3. In a system as set forth in claim 2, said first filter means being also driven by said second sawtooth wave signal.

4. In a system as set forth in claim 2, said combining means including means for varying the ratio of the peak amplitudes of the two signals combined therein.

5. In a system as set forth in claim 4, said varying means being an electrical signal means.

6. In a system as set forth in claim 4, means for synchronizing said two signal sources with their square and sawtooth wave signals in phase, and said varying means including means for inverting said square wave signal.

7. A method of doubling the frequency of a sawtooth signal, comprising providing a square wave signal of substantially equal frequency, but being approximately 180° out of phase with said sawtooth signal and having a peak amplitude of about one half that of said sawtooth signal and adding said signals together.

8. A sawtooth signal frequency doubler, comprising a source of a sawtooth wave signal, a source of a square wave signal, and means connected to said sources for combining said sawtooth and square wave signals about 180° out of phase with each other and in the peak amplitude relationship of a ratio of about 2:1.

9. In a system for electronic music generation, a source of square wave signals of a given frequency, a source of sawtooth wave signals of substantially the same frequency, means synchronizing said two sources, means for combining said two signals in about a 180° out of phase relationship, means for varying the relative amplitudes of said two signals, and tone color filter means connected to be driven by the output of said combining means.

10. In a system as set forth in claim 9, said varying means being coupled to the source of square wave signals.

11. In a system as set forth in claim 9, said varying means being coupled to the source of sawtooth wave signals.

12. An electronic music generation system including:

(a) a source of substantially square wave signals having a given frequency;

(b) a source of a first substantially sawtooth signal having said frequency;

(c) means connected to said sources for both (1) selecting said signals individually and (2) selecting said signals in such combination as to derive a second signal from said two signals; and (d) tone color filter means connected to said sources and said selecting means.

13. In an electronic music generation system:

(a) a source of substantially square wave signals having a given frequency;

(b) a source of a first substantially sawtooth wave signal having said frequency;

(c) means for combining said two signals in such substantially 180° out-of-phase relationship as to derive a second substantially sawtooth wave signal from said two signals, said combining means including means for relating the peak amplitudes of the two signals combined therein in the ratio of substantially 2:1; and (d) tone color filter means including a first filter means connected to be driven by said square wave signal, a second filter means connected to be driven by said first sawtooth wave signal, and a third filter means connected to be driven by said second sawtooth wave signal.

14. In a system as set forth in claim 13, means for synchronizing said two signal sources with said square and first sawtooth waves in phase, said combining means including means for inverting said square wave signal, and said peak amplitude relating means comprising an adding network.

15. In an electronic music generation system:

(a) a source of substantially square wave signals having a given frequency;

(b) a source of a first substantially sawtooth wave signal having said frequency;

(c) means for combining said two signals in such substantially 180° out-of-phase relationship as to derive a second substantially sawtooth wave signal from said two signals, said combining means including means for relating the peak amplitudes of the two signals combined therein in the ratio of substantially 2:1; and (d) tone color filter means connected to receive said signals comprising first filter means connected to be driven by said square wave signal and second color filter means connected to be driven by both said sawtooth wave signals.

16. In a system as set forth in claim 15, means for synchronizing said two signal sources with said square and sawtooth wave signals in phase, said combining means including means for inverting said square wave signal, and said peak amplitude relating means comprising an adding network.

17. In a system as set forth in claim 16, said first filter means being also driven by said second sawtooth wave signal.

References Cited

UNITED STATES PATENTS

| | | | |
|---|---|---|---|
| 2,689,300 | 9/1954 | Oberman et al. | 328—38 |
| 3,201,611 | 8/1965 | Mollinga | 307—88.5 |
| 3,215,767 | 11/1965 | Martin | 84—1.24 |
| 3,255,363 | 6/1966 | Stella | 307—88.5 |
| 3,255,416 | 6/1966 | Stella | 307—88.5 |
| 3,278,765 | 10/1966 | Mudie | 307—106 |
| 3,336,432 | 8/1967 | Hurvitz | 84—1.01 |

ARTHUR GAUSS, *Primary Examiner.*

STANLEY D. MILLER, *Assistant Examiner.*

U.S. Cl. X.R.

84—1.11, 1.19, 1.22; 307—220, 225, 228, 261; 328—14, 20, 156, 181